United States Patent
Pagan

(10) Patent No.: US 7,243,245 B2
(45) Date of Patent: Jul. 10, 2007

(54) METHOD AND SYSTEM FOR PERFORMING AUTOMATIC STARTUP APPLICATION LAUNCH ELIMINATION

(75) Inventor: William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 10/600,772

(22) Filed: Jun. 20, 2003

(65) Prior Publication Data

US 2004/0260956 A1   Dec. 23, 2004

(51) Int. Cl.
  G06F 1/00      (2006.01)
  G06F 9/00      (2006.01)
  G06F 9/24      (2006.01)
  G06F 15/177    (2006.01)

(52) U.S. Cl. .............................. 713/300; 713/1; 713/2

(58) Field of Classification Search ..................... None
  See application file for complete search history.

(56) References Cited

U.S. PATENT DOCUMENTS

| | | | |
|---|---|---|---|
| 5,548,304 A | | 8/1996 | Yoshino et al. ............ 345/145 |
| 5,794,052 A | * | 8/1998 | Harding ...................... 717/178 |
| 5,907,701 A | * | 5/1999 | Hanson ....................... 718/101 |
| 5,995,102 A | | 11/1999 | Rosen et al. ................ 345/339 |
| 6,085,268 A | * | 7/2000 | Lee et al. ...................... 710/72 |
| 6,118,449 A | | 9/2000 | Rosen et al. ................ 345/339 |
| 6,148,387 A | | 11/2000 | Galasso et al. ............. 711/203 |
| 6,173,246 B1 | * | 1/2001 | Billups, III .................... 703/22 |
| 6,324,546 B1 | | 11/2001 | Ka et al. ...................... 707/203 |
| 6,330,588 B1 | * | 12/2001 | Freeman ..................... 709/202 |
| 6,405,309 B1 | | 6/2002 | Cheng et al. .................... 713/1 |
| 6,671,812 B1 | * | 12/2003 | Balasubramaniam et al. . 726/22 |
| 2001/0047472 A1 | | 11/2001 | Huntington et al. ........... 713/2 |
| 2002/0069354 A1 | | 6/2002 | Fallon et al. .................... 713/2 |
| 2002/0082912 A1 | * | 6/2002 | Batachia et al. .............. 705/14 |
| 2003/0212906 A1 | * | 11/2003 | Arnold et al. ............... 713/201 |
| 2004/0117787 A1 | * | 6/2004 | Sowa et al. .................. 717/174 |
| 2004/0225746 A1 | * | 11/2004 | Niell et al. ................... 709/231 |

FOREIGN PATENT DOCUMENTS

| | | |
|---|---|---|
| JP | 2000-339144 | 12/2000 |
| JP | 2001-75787 | 3/2001 |

OTHER PUBLICATIONS

Smith, G.J., "Power Savings Using Predictive Usage Methods," Article 411130, Research Disclosure, Jul. 1998, pp. 1006-1008.
Reich, D., "Method and Apparatus for a High Performance Operating System in a RIPL Environment," Article 443119, Mar. 2001, p. 457.

* cited by examiner

*Primary Examiner*—Rehana Perveen
*Assistant Examiner*—Michael J. Brown
(74) *Attorney, Agent, or Firm*—Sawyer Law Group LLP

(57) ABSTRACT

A method and system for controlling a startup sequence in a computer system is disclosed. The method and system include monitoring at least one aspect of a plurality of startup applications launched during the startup sequence. The method and system further include analyzing the at least one aspect of the plurality of startup applications based on at least one criteria. The at least one criteria indicates whether a portion of the plurality of startup applications is extraneous at startup. The method and system further include automatically removing at least one of the portion of the plurality of startup applications from the startup sequence.

39 Claims, 3 Drawing Sheets

METHOD AND SYSTEM FOR PERFORMING AUTOMATIC STARTUP APPLICATION LAUNCH ELIMINATION

FIELD OF THE INVENTION

The present invention relates to computer systems, and more particularly to a method and system for automatically eliminating startup applications from being launched during the startup sequence.

BACKGROUND OF THE INVENTION

Conventional computer systems typically launch a number of applications during startup. For example, FIG. 1 is a diagram of a conventional computer system 10. The computer system 10 includes a conventional operating system (OS) 12 having a conventional startup sequence 13, and conventional applications 14, 16, 18, and 20. The startup sequence 13 thus controls the applications which are launched upon startup of the OS 12. The applications 14, 16, and 18 are launched during the startup sequence 13 of the OS 12 of the computer system 10. Consequently, applications 14, 16, and 18 are termed startup applications 14, 16, and 18. The startup applications 14, 16, and 18 may place themselves in the startup sequence 13 during installation or may be placed there by the user. Note that the number of applications shown is for exemplary purposes only. There are generally a larger number of startup and other applications 14, 16, 18, and 20. Because they are startup applications, each time that the conventional OS 12 starts up, the startup applications 14, 16, and 18 launch. These startup applications 14, 16, and 18 remain in the startup sequence 13 unless the user manually removes the startup applications 14, 16, and 18 from the startup sequence 13.

Although many startup applications 14, 16, and 18 are launched, many of the startup applications are extraneous for one reason or another. Some startup applications 14, 16, and 18 may be seldom (or never) used by the user. Such applications may have corresponding icons that are seldom selected by the user or may be killed by the user. Other startup applications 14, 16, and 18 may crash regularly. Other startup applications 14, 16, and 18, such as spyware, may exhibit unintended or undesired behavior. Other startup applications may require hardware not existing on the conventional computer system 10. Furthermore, as more applications are placed in the startup sequence 13 (automatically or by express request by the user) the time required to perform the startup sequence 13 increases. Thus, performance of the conventional computer system 10 degrades. This decrease in the level of performance occurs even though at least some, and potentially many, of the startup applications 14, 16, and 18 are seldom used and/or undesirable for other reasons. It may, therefore, be desirable for the user to remove one or more of the startup applications 14, 16, and 18 from the startup sequence 13 of the OS 12.

FIG. 2 is a flow chart depicting a conventional method 30 for removing extraneous startup applications from the startup sequence 13. The startup sequence 13 launches all startup applications 14, 16, and 18, via step 32. Step 32 occurs each time the conventional computer system 10 starts up or is rebooted. In other words, step 32 essentially executes the startup sequence, which launches applications upon the OS startup. During operation of the conventional computer system 10, the user determines whether one or more of the startup applications 14, 16, and 18 is extraneous, via step 34. Thus, in step 34 the user tracks the startup applications 14, 16, and 18 and determines which, if any, of the startup applications 14, 16, and 18 the user desires to eliminate from the startup sequence 13 for any reason. For example, step 34 might include the user determining which, if any, applications are seldom or never used. The user also determines how to remove the startup applications from the startup sequence, via step 36. For example, step 36 might include determining the location of the system registry (not shown) to access the startup sequence 13 and determining which data to remove from the startup sequence 13. The user then manually removes the extraneous startup applications 14, 16, and/or 18 from the startup sequence, via step 38.

Although the method 30 functions, one of ordinary skill in the art will readily recognize that the user may not have the technical skill to determine in step 34 which startup applications 14, 16, and 18 are extraneous. The user may also not be capable of determining the location of the startup sequence 13 in order to remove the startup applications from the startup sequence 13. Furthermore, even if the user can locate and access the startup sequence 13, the use may not have sufficient knowledge to remove the startup application (s) 14, 16, and 18 from the startup sequence. Thus, the conventional computer system 10 continues to have a degradation in performance during startup.

Accordingly, what is needed is a system and method for automatically removing extraneous startup applications from the startup sequence. The present invention addresses such a need.

SUMMARY OF THE INVENTION

The present invention provides a method and system for controlling a startup sequence in a computer system. The method and system comprise monitoring at least one aspect of a plurality of startup applications launched during the startup sequence. The method and system further comprise analyzing the at least one aspect of the plurality of startup applications based on at least one criteria. The at least one criteria indicates whether a portion of the plurality of startup applications is extraneous at startup. The method and system further comprise automatically removing from the startup sequence at least one of the portion of the plurality of startup applications that is extraneous.

According to the system and method disclosed herein, the present invention provides a mechanism for more easily removing extraneous startup applications from the startup, thereby allowing for improved performance of the computer system

DETAILED DESCRIPTION OF THE INVENTION

The present invention relates to an improvement in computer systems. The following description is presented to enable one of ordinary skill in the art to make and use the invention and is provided in the context of a patent startup application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for controlling a startup sequence in a computer system. The method and system comprise monitoring at least one aspect of a plurality of startup applications launched during the startup sequence. The method and system further comprise analyzing the at least one aspect of the plurality of startup applications based on at least one criteria. The at least one criteria indicates whether a portion of the plurality of startup applications is extraneous at startup. The method and system further comprise automatically removing from the startup sequence at least one of the portion of the plurality of startup applications that is extraneous.

The present invention will be described in terms of a particular computer system and particular method having certain steps. However, one of ordinary skill in the art will readily recognize that this method and system will operate effectively for other computer systems and other methods having different and/or additional steps not inconsistent with the method and system. The present invention is also described in the context of certain criteria. However, one of ordinary skill in the art will readily recognize that the method and system are not limited to such criteria. Instead, additional and/or other criteria could be used.

Figure 3:
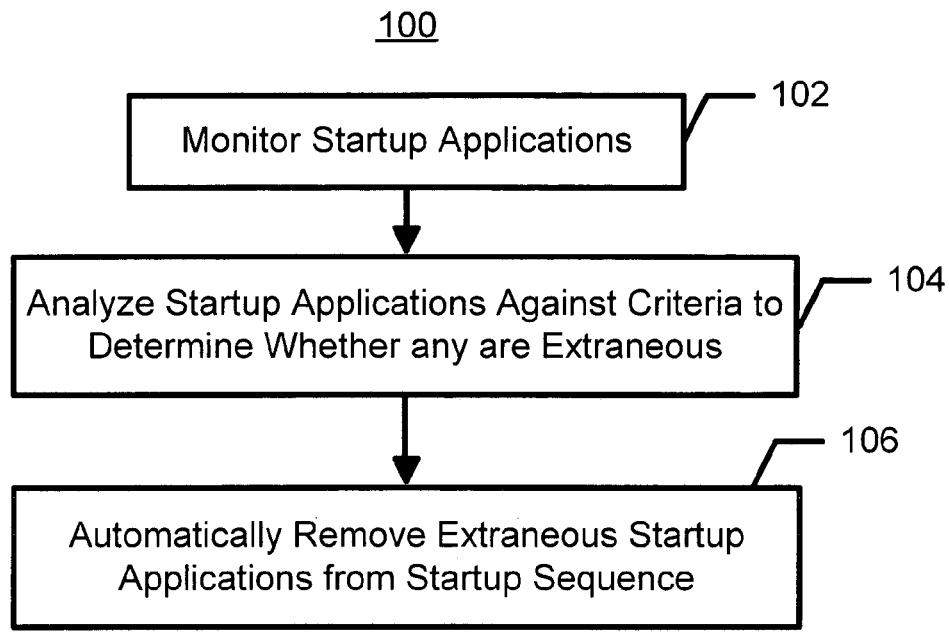
FIG. 3 is a high-level flow chart depicting one embodiment of a method in accordance with the present invention for removing extraneous startup applications from the startup sequence.

To more particularly illustrate the method and system in accordance with the present invention, refer now to FIG. 3, depicting one embodiment of a method 100 in accordance with the present invention for removing extraneous startup applications from the startup sequence of a computer system. The method 100 preferably commences after startup of the computer system. In addition, the method 100 may store statistics so that the behavior of the computer system over time and across multiple startup operations could be utilized.

The startup applications are monitored, via step 102. One or more aspects of the startup applications could be monitored in step 102. Such aspects could include but are not limited to characteristics of the startup application, the behavior of the startup application, and/or components used by the startup application. For example, the lifetime (time between launch and termination) and/or method of termination of the startup applications could be monitored. The use of the startup application could also be monitored. For example, if the startup application loads an icon for using the application, the frequency with which the icon is accessed could be monitored in step 102. The frequency with which the startup application is launched could also be monitored. If the startup application requires certain hardware, the presence or absence of the hardware might be monitored in step 102. For example, for a startup application which monitors LAN traffic, the presence or absence of a corresponding PCMCIA network card could be monitored in step 102. The behavior of the startup application might be monitored. For example, in order to determine whether one or more startup applications include unauthorized spyware, it could be monitored whether the startup application(s) routinely accesses certain Internet addresses. Similarly, the crash rate of the startup application and/or of the computer system on which the startup application resides could also be monitored. Note that any combination of one or more of the above aspects, or other aspects, could be monitored in step 102.

Step 102 could also include saving data relating to the aspects of the startup applications that are monitored. Thus, the aspects of the startup applications could be monitored and, as discussed below, analyzed across multiple startups.

The aspects of the startup applications that are monitored in step 102 are analyzed against certain criteria to determine whether one or more of the startup applications are extraneous, via step 104. As used herein, an application that is extraneous has certain aspect(s) that fit the criteria. In addition, an application need not be completely unnecessary or never used in order to be considered extraneous. Instead, the startup application may merely be undesirable for the reasons described below. For example, if the lifetime is monitored in step 102, the corresponding criteria could include a minimum threshold for the lifetime, such as a few seconds. If the lifetime of the startup application is less than this threshold, the application might be considered to be extraneous because the short lifetime indicates that the user terminates the application. Similarly, if the method of termination is monitored in step 102, the criteria could include certain user-initiated methods of termination such as a manual exit/close action or the use of a task manager to terminate the application. If such a method of termination is regularly utilized by the user, it may indicate that the user finds the application undesirable for some reason. If the behavior of the startup application is monitored in step 102, then the criteria used could include whether the startup application repeatedly accesses certain Internet addresses, or exhibits other behavior of spyware. In addition, if the presence of hardware used by the startup application is monitored in step 102, then the criteria could include the presence or absence of the hardware. If the hardware required by the startup application is not present, then the startup application might be considered extraneous. Similarly, if the crash rate of the startup application and/or of the computer system on which the startup application resides are monitored, then the criteria may include particular thresholds. If the crash rates meet or exceed these thresholds, then the applications might be considered extraneous. If a combination of one or more of the above aspects, or other aspects, is monitored then the criteria against which the aspects are analyzed may be a combination of disparate criteria.

If it is determined that some portion of the startup applications are extraneous, then some of these extraneous startup applications are automatically removed from the startup sequence, via step 106. In a preferred embodiment, step 106 includes informing the user of the extraneous startup applications as they are discovered and allowing the user make a decision to either keep or remove the startup applications from the startup sequence. In such an embodiment step 106 would also include the automatic removal of the selected extraneous startup applications without requiring the user to have any additional knowledge of the startup sequence. However, in an alternate embodiment, step 106 could include the automatic removal of one or more of the extraneous startup applications without allowing the user to select which extraneous applications are removed. Furthermore, in yet another embodiment, step 106 could include offering a user the choice of removing the extraneous startup application from the startup sequence and uninstalling the extraneous startup application. In such an embodiment step 106 would also include either removing the extraneous startup application from the startup sequence or uninstalling the extraneous startup application, depending upon the user's choice. Moreover, in an alternate embodiment, the "user" need not be a person. Instead, notification of extraneous startup applications and selection of one or more appropriate claims could be to a portion of the OS or other software.

Thus, using the method 100, extraneous applications may be removed from the startup sequence. Thus, the number of applications launched upon startup of the OS may be reduced. The time to complete the startup sequence is thereby decreased and performance of the computer system improved. Furthermore, no special knowledge in the user relating to the startup applications or the startup sequence is required. Consequently, the control over the startup sequence is improved.

Figure 4:
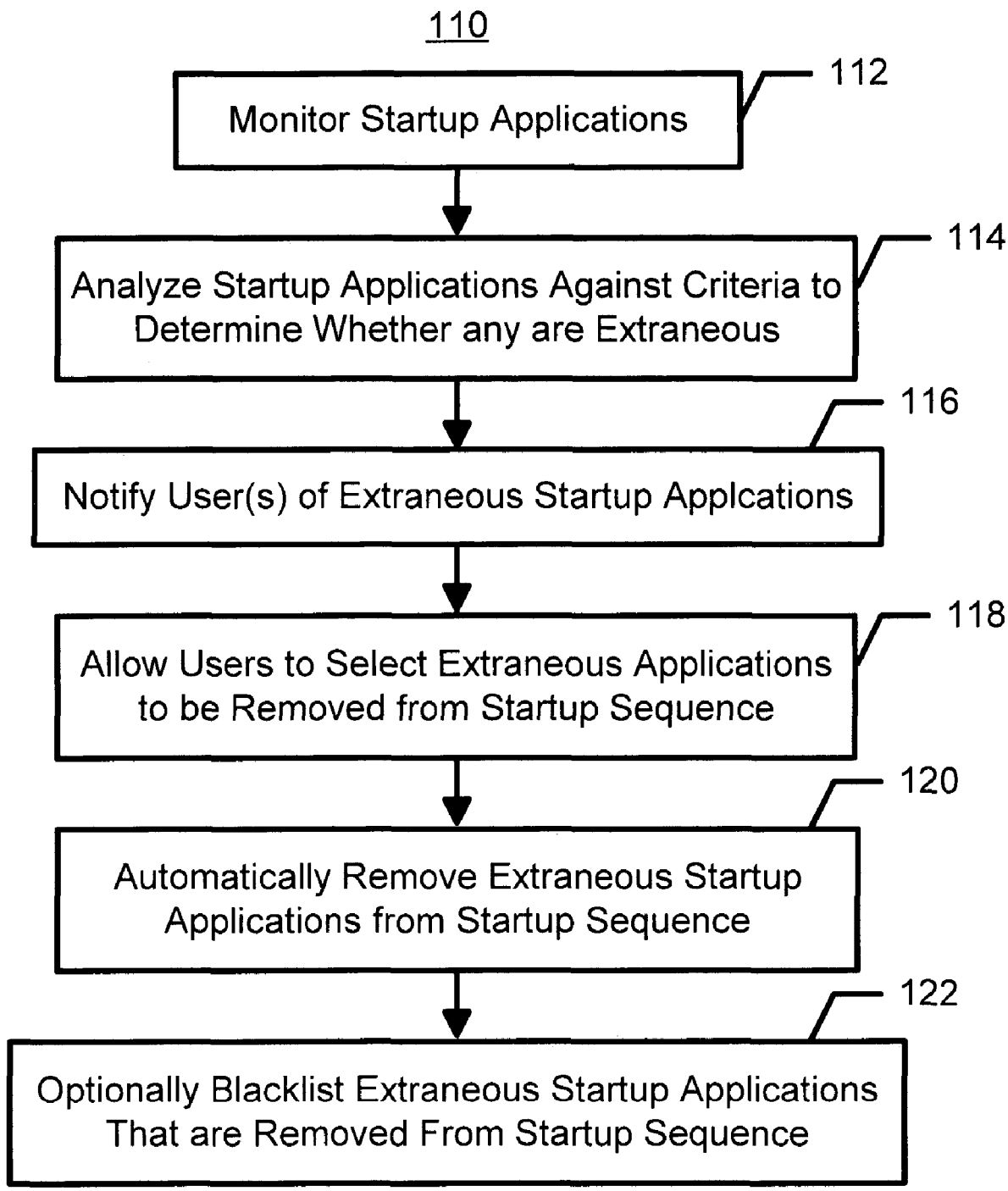
FIG. 4 is a more-detailed flow chart depicting one embodiment of a method in accordance with the present invention for removing extraneous startup applications from the startup sequence.

FIG. 4 is a more-detailed flow chart depicting a preferred embodiment of a method 110 in accordance with the present invention for removing extraneous startup applications from the startup sequence. The startup applications are monitored, via step 12. One or more aspects of the startup applications could be monitored in step 112. Thus, step 112 is analogous to step 102. Step 112 could also include saving data relating to the aspects of the startup applications that are monitored. Thus, the aspects of the startup applications could be monitored and, as discussed below, analyzed across multiple startups.

The aspects of the startup applications that are monitored in step 112 are analyzed against certain criteria to determine whether one or more of the startup applications are extraneous, via step 114. Thus, step 114 corresponds to step 104.

If it is determined that some portion of the startup applications are extraneous, then the user is notified of the extraneous startup applications, via step 116. Step 116 preferably includes providing the user with a prompt or other warning indicating that certain startup applications are extraneous. The user is allowed to select which (if any) of the extraneous startup applications are desired to be removed from the startup sequence, via step 118. Step 118 may include allowing a user to enter the identity of the startup applications that are both extraneous and desired to be removed from the startup sequence. In an alternate embodiment, step 118 may include providing the user the option of uninstalling the extraneous startup application. Note that steps 114 and 118 could be merged into a single step that provides, for example, a prompt that lists the extraneous startup applications with boxes or other indicia for selecting the extraneous startup applications to be removed from the startup sequence, for example by clicking on the appropriate box. Also in step 118, the user preferably selects whether or not to blacklist the startup application being removed.

The selected extraneous applications are automatically removed from the startup sequence, via step 120. Note that if the user had decided to uninstall the extraneous startup application, then step 120 would uninstall the application instead of removing the extraneous startup application from the startup sequence. One or more of the selected startup applications may be optionally blacklisted, via step 122. When a startup application is blacklisted, the startup application is removed from the startup sequence until the user explicitly indicates that the startup application is to be returned to the startup sequence.

Thus, using the method 110, extraneous applications may be removed from the startup sequence. Thus, the number of applications launched upon startup of the OS may be reduced. The time to complete the startup sequence is thereby decreased and performance of the computer system improved. Furthermore, no special knowledge in the user relating to the startup applications or the startup sequence. Consequently, the control over the startup sequence is improved.

Figure 1:
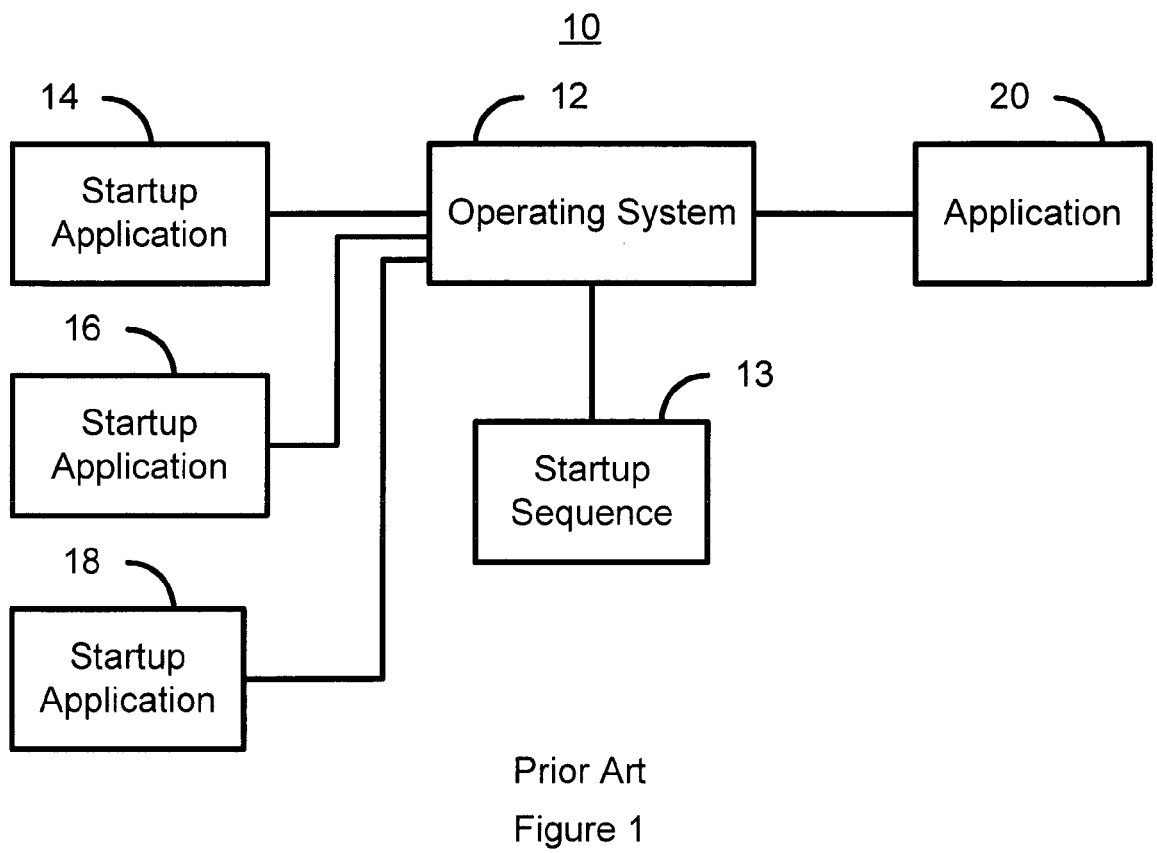
FIG. 1 is a diagram of a conventional computer system.
Figure 2:
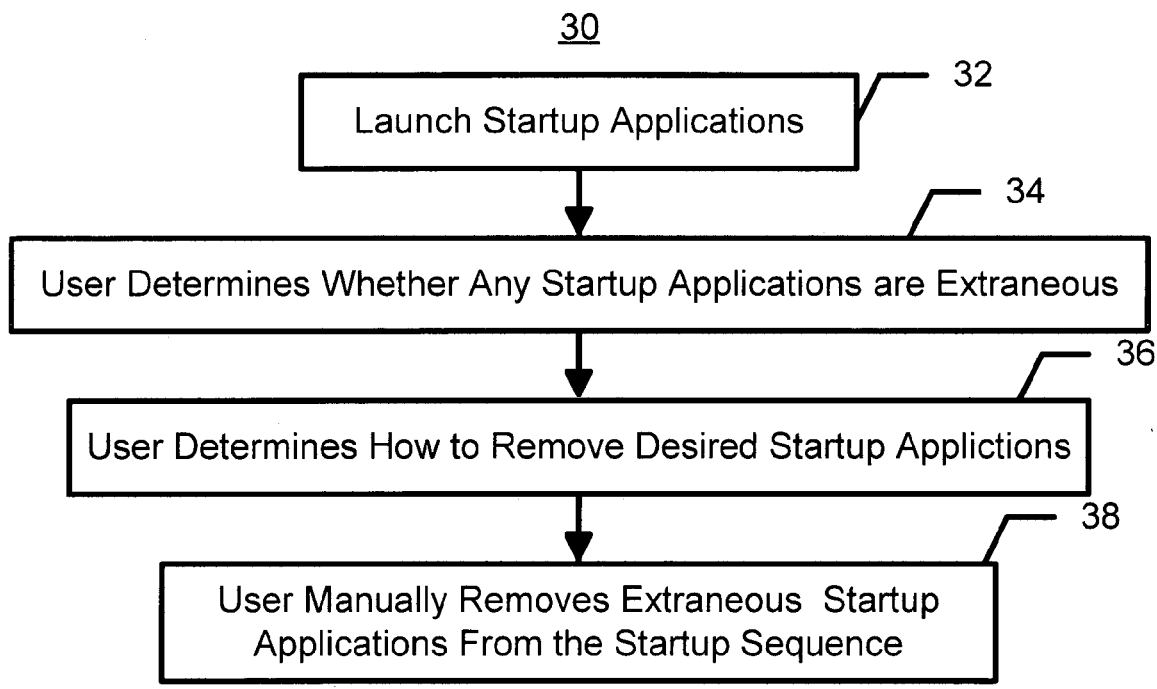
FIG. 2 is a flow chart depicting a conventional method for removing extraneous startup applications from the startup sequence.
Figure 5:
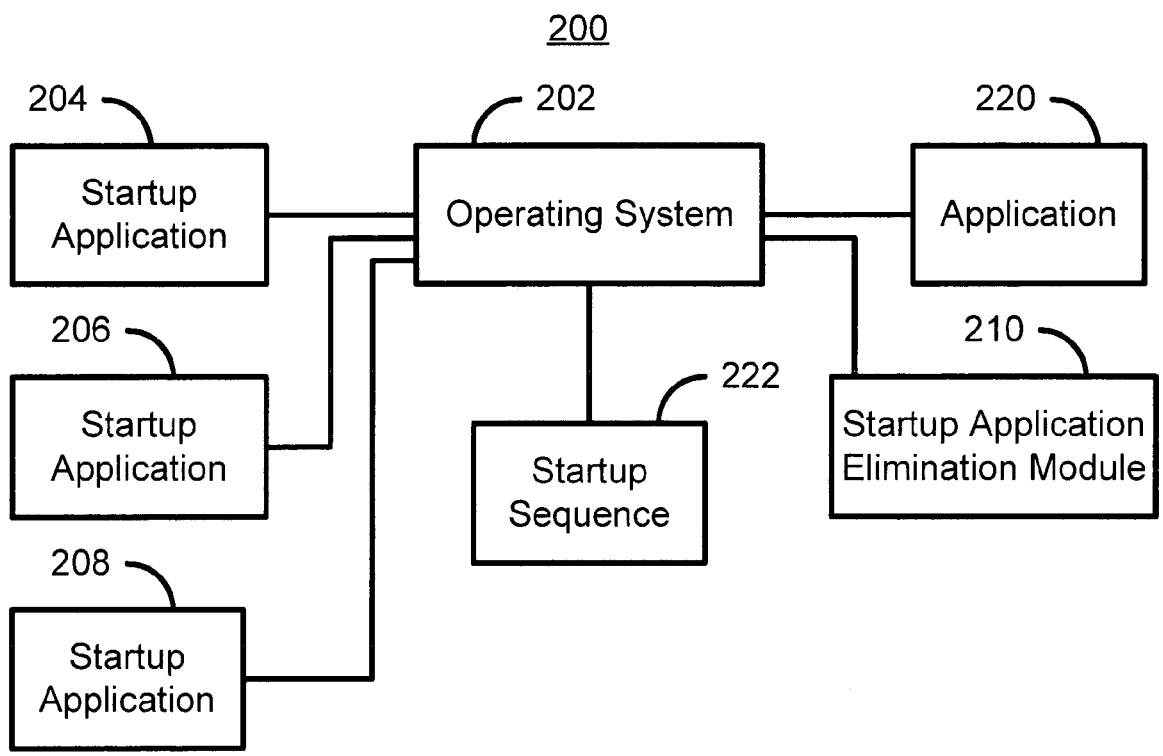
FIG. 5 is a diagram of a computer system capable of automatically removing extraneous startup applications from the startup.

FIG. 5 is a diagram of a computer system 200 capable of automatically removing extraneous startup applications from the startup sequence. The computer system 200 includes an OS 202, a startup application elimination module 210, a startup applications 204, 206, and 208, application 220, and startup sequence 222. The OS 202 and applications 204, 206, 208, and 220 correspond to the OS 12 and the applications 14, 16, 18, and 20 depicted in FIG. 1. Similarly, the startup sequence 222 corresponds to the startup sequence 13 of FIG. 1.

Referring back to FIG. 5, the startup application elimination module 210 is preferably used to implement the methods 100 and/or 200. Thus, the startup application elimination module 210 monitors the aspects of the ISPE 204, 206, and 208, determines whether the standard applications 204, 206, and 208 are to be removed from the startup sequence 222, preferably allows for selection of the startup applications actually removed from the startup sequence, and automatically removes the selected applications from the startup sequence. In one embodiment, the startup application elimination module 210 may also uninstall the extraneous startup application, if desired. Furthermore, the startup application elimination module 210 preferably blacklists selected startup applications.

Thus, using the methods 100 and 110 and/or the startup application elimination module 210, extraneous startup applications can be automatically removed from the startup sequence. Consequently, the startup sequence can be performed in a smaller amount of time and performance improved. Furthermore, the user need not have specialized knowledge about the startup sequence 213 or the applications 204, 206, 208, and 220.

A method and system has been disclosed for controlling the startup sequence of a computer system in order to remove extraneous startup applications from the startup sequence. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for controlling a startup sequence in a computer system comprising the steps of:
   automatically monitoring at least one aspect of a plurality of startup applications launched during the startup sequence;
   automatically analyzing the at least one aspect of the plurality of startup applications based on at least one criteria, the at least one criteria indicating whether a portion of the plurality of startup applications is extraneous at startup, the portion of the plurality of startup applications being extraneous if exhibiting at least one undesirable characteristic, the undesirable characteristic including at least one time of termination less than a particular threshold, a crash rate greater than a particular threshold, use of the portion of the plurality of startup application being below a particular threshold, at least one aberrant behavior during operation, and utilizing unavailable hardware;

automatically removing from the startup sequence at least one of the portion of the plurality of startup applications that are extraneous.

2. The method of claim 1 wherein the analyzing, step further includes the step of:

analyzing at least one characteristic of the plurality of startup applications, the portion of the plurality of startup applications exhibiting the at least one undesirable characteristic.

3. The method of claim 2 wherein the at least one undesirable characteristic is the particular termination method.

4. The method of claim 2 wherein the at least one undesirable characteristic is the time of termination less than the particular threshold.

5. The method of claim 2 wherein the at least one undesirable characters is the crash rate greater than a particular threshold.

6. The method of claim 2 wherein each of the portion of the plurality loads an icon and wherein the at least one undesirable characenstic is use of the icon being below a particular threshold.

7. The method of claim 2 wherein the at least one undesirable characteristic includes accessing at least one particular internet address.

8. The method of claim 1 wherein the analyzing step further includes the step of:

analyzing at least one behavior of the plurality of startup applications, the portion of the plurality of startup applications exhibiting the at least one aberrant behavior.

9. The method of claim 1 wherein the analyzing step further includes the step of:

determining whether hardware utilized by each of the plurality of startup applications is available on the computer system, the portion of the plurality of utilizing the unavailable hardware.

10. The method of claim 1 wherein the automatically removing step further includes the step of:

providing a notification that the portion of the plurality of startup applications is extraneous.

11. The method of claim 10 wherein the automatically removing step further includes the steps of:

allowing a user to indicate whether the at least one of the portion of the plurality of startup applications is desired to be removed; and automatically removing at least one of the portion of the plurality of startup applications from the startup sequence only if the user indicates that the at least one of the portion of the plurality of startup applications is desired to be removed.

12. The method of claim 11 wherein the automatically removing step further includes the step of:

blacklisting the at least one of the portion of the plurality of startup applications so that the at least one of the portion of the plurality of startup applications is not reentered to the startup sequence without the user's explicit approval.

13. The method of claim 1 wherein the automatically removing step further includes the steps of:

allowing a user to select between automatically removing the at least one of the portion of plurality of applications from the startup sequence and uninstalling the at least one of the portion of plurality of applications.

14. A computer-readable storage medium containing a program for controlling a startup sequence in a computer system, the program including instructions for:

automatically monitoring at least one aspect of a plurality of startup applications launched during the startup sequence;

automatically analyzing the at least one aspect of the plurality of startup applications based on at least one criteria, the at least one criteria indicating whether a portion of the plurality of startup applications is extraneous at startup, the portion of the plurality of startup applications being extraneous if exhibiting at least one undesirable characteristic, the undesirable characteristic including at least one of a time of termination less than a particular threshold, a crash rate greater than a particular threshold, use of the portion of the plurality of startup application being below a particular threshold, at least one aberrant behavior during operation, and utilizing unavailable hardware;

automatically removing from the startup sequence at least one of the portion of the plurality of startup applications that is extraneous.

15. The computer-readable storage medium of claim 14 wherein the analyzing instructions further includes instructions for:

analyzing at least one characteristic of the plurality of startup applications, the portion of the plurality of startup applications exhibiting the at least one undesirable characteristic.

16. The computer-readable storage medium of claim 15 wherein the at least one undesirable characteristic is the time of termination less than the particular threshold.

17. The computer-readable storage medium of claim 15 wherein the at least one undesirable characteristic is the crash rate greater than the particular threshold.

18. The computer-readable storage medium of claim 15 wherein each of the portion of the plurality loads an icon and wherein the at least one undesirable characteristic is use of the icon being below a particular threshold.

19. The computer-readable medium of claim 15 wherein the at least one undesirable characteristic includes accessing at least one particular internet address.

20. The computer-readable storage medium of claim 14 wherein the at least one undesirable characteristic is the particular termination method.

21. The computer-readable storage medium of claim 14 wherein the analyzing instructions further includes instructions for:

analyzing at least one behavior of the plurality of startup applications, the portion of the plurality of startup applications exhibiting the at least one aberrant behavior.

22. The computer-readable storage medium of claim 14 wherein the analyzing step further includes the step of:

determining whether hardware utilized by each of the plurality of startup applications is available on the computer system, the portion of the plurality of utilizing the unavailable hardware.

23. The computer-readable storage medium of claim 14 wherein the automatically removing instructions further includes instructions for:
  providing a notification that the portion of the plurality of startup applications is extraneous.

24. The computer-readable storage medium of claim 23 wherein the automatically removing step instructions includes instructions for:
  allowing a user to indicate whether the at least one of the portion of the plurality of startup applications is desired to be removed; and
  automatically removing at least one of the portion of the plurality of startup applications front the startup sequence only if the user indicates that the at least one of the portion of the plurality of startup applications is desired to be removed.

25. The computer-readable storage medium of claim 24 wherein the automatically removing instructions further includes instructions for:
  blacklisting the at least one of the portion of the plurality of startup applications so that the at least one of the portion of the plurality of startup applications is not reentered to the startup sequence without the user's approval.

26. The computer-readuble storage medium of claim 14 wherein the automatically removing instructions further includes instructions for:
  allowing a user to select between automatically removing the at least one of the portion of plurality of applications from the startup sequence and uninstalling the at least one of the portion of plurality of applications.

27. A computer system comprising;
  a plurality of startup applications launched during startup;
  a startup application elimination module for automatically monitoring at least one aspect of the plurality of startup applications launched during a startup sequence, the startup application elimination module also for automatically analyzing the at least one aspect of the plurality of startup applications to based on at least one criteria, the at least one criteria indicating whether a portion of the plurality of startup applications is extraneous at startup, the portion of the plurality of startup application being extraneous if exhibiting at least one undesirable characteristic, the undesirable characteristic including at least one of a time of termination less than a particular threshold, a crash rate greater than a particular threshold, use of the portion of the plurality of startup application being below a particular threshold, at least one aberrant behavior during operation, and utilizing an available hardware, startup application elimination module also for automatically removing from the startup sequence at least one of the portion of the plurality of startup applications that is extraneous.

28. The computer system of claim 27 wherein the startup application elimination module further analyzes at least one characteristic of the plurality of startup applications, the portion of the plurality of startup applications exhibiting the at least one undesirable characteristic.

29. The computer system of claim 28 wherein the at least one undesirable characteristic is the particular termination method.

30. The computer system of claim 28 wherein the at least one undesirable characteristic is the time of termination less than the particular threshold.

31. The computer system of claim 28 wherein the at least one undesirable characteristic is crash rate greater than the particular threshold.

32. The computer system of claim 28 wherein each of the portion of the plurality loads an icon and wherein the at least one undesirable characteristic is use of the icon being below a particular threshold.

33. The computer system of claim 28 wherein the at least one undesirable characteristic includes accessing at least one particular internet address.

34. The computer system of claim 27 wherein the startup application elimination module further analyzes at least one behavior of the plurality of startup applications, the portion of the plurality of startup applications exhibiting the at least one aberrant behavior.

35. The computer system of claim 27 wherein the startup application elimination module further determines whether hardware utilized by each of the plurality of startup applications is available on the computer system, the portion of the plurality of utilizing the unavailable hardware.

36. The computer system of claim 27 wherein the startup application elimination module further provides a notification that the portion of the plurality of startup applications is extraneous.

37. The computer system of claim 36 wherein the computer system further includes at least one input/output device that allows a user to indicate whether the at least one of the portion of the plurality of startup applications is desired to he removed; and
  wherein the startup application elimination module further automatically removes at least one of the portion of the plurality of startup applications from the startup sequence only if the user indicates that the at least one of the portion of the plurality of startup applications is desired to be removed.

38. The computer system of claim 37 wherein the startup application elimination module further blacklists the at least one of the portion of the plurality of startup applications so that the at least one of the portion of the plurality of startup applications is not reentered to the startup sequence without the user's approval.

39. The computer system of claim 27 wherein the startup application elimination module further allows a user to select between automatically removing the at least one of the portion of plurality of applications from the startup sequence and uninstalling the at least one of the portion of plurality of applications.

* * * * *